United States Patent [19]

Malizio et al.

[11] Patent Number: 4,832,084

[45] Date of Patent: May 23, 1989

[54] DUAL GRAPHITE STRUCTURED PIPE

[75] Inventors: Andrew B. Malizio, Pelham; Robert W. Jennings, Helena, both of Ala.

[73] Assignee: United States Pipe and Foundry Company, Birmingham, Ala.

[21] Appl. No.: 197,486

[22] Filed: May 23, 1988

Related U.S. Application Data

[62] Division of Ser. No. 48,278, May 11, 1987, Pat. No. 4,791,976.

[51] Int. Cl.[4] .............................................. F16L 9/14
[52] U.S. Cl. .................................. 138/140; 138/177; 138/143; 428/682; 148/909; 148/910; 148/321; 148/323
[58] Field of Search ...................... 138/140, 143, 177; 428/682, 586; 148/909, 910, 321-324

[56] References Cited

U.S. PATENT DOCUMENTS

| | | | |
|---|---|---|---|
| 1,614,863 | 1/1927 | Beatty | 420/13 |
| 1,678,931 | 7/1928 | Blumberg et al. | 164/114 |
| 1,954,892 | 1/1933 | Russell et al. | 148/909 |
| 3,349,831 | 10/1967 | Moore et al. | 164/58 |
| 3,415,307 | 12/1968 | Schuh et al. | 164/114 |
| 3,703,922 | 11/1972 | Dunks et al. | 164/57 |
| 4,058,153 | 11/1977 | Pierrel | 164/58 |
| 4,412,578 | 11/1983 | Doliwa et al. | 164/349 |
| 4,579,164 | 4/1986 | Hartley et al. | 164/55.1 |

FOREIGN PATENT DOCUMENTS

| | | |
|---|---|---|
| 37-1854 | 5/1962 | Japan . |
| 519276 | 2/1975 | U.S.S.R. . |
| 908513 | 12/1979 | U.S.S.R. . |

*Primary Examiner*—Deborah Yee
*Attorney, Agent, or Firm*—James W. Grace; Charles W. Vanecek

[57] ABSTRACT

This invention relates to a heavy wall monolithic iron pipe comprising nodular graphite in the outer portion of its wall and flake or quasi-flake graphite in the inner portion of its wall and a method for making said pipe. The central portion of the wall of the pipe may be a combination of nodular graphite and flake or quasi-flake graphite.

3 Claims, 3 Drawing Sheets

DUAL GRAPHITE STRUCTURED PIPE

This is a division of application Ser. No. 048,278, filed May 11, 1987, now U.S. Pat. No. 4,791,976.

BACKGROUND OF THE INVENTION

1. Field of the Invention

This invention relates to a heavy wall monolithic iron pipe comprising nodular graphite in the outer portion of its wall and flake or quasi-flake graphite in the inner portion of its wall and a method for making said pipe. The central portion of the wall of the pipe will be a combination of nodular graphite and flake or quasi-flake graphite.

In sulfuric acid plants, sulfuric acid at a concentration of 95% or greater and at temperatures of about 250°–300° F. must be piped throughout the plant for processing. The problems associated with the pumping of such concentrated sulfuric acid include corrosion-erosion of the pipes used for transporting the liquid. Not only must the pipe be resistant to the erosion caused by the rapid flow of concentrated sulfuric acid, but the pipe must also have sufficient strength to prevent their collapse.

It is known that for transporting sulfuric acid at room temperature, steel pipe may be used to transport the concentrated sulfuric acid. However, at the elevated temperatures of 250°–300° F., steel pipe quickly corrode-erode and are not practical.

On the other hand, gray cast iron pipe with heavy walls have been used because such pipe resist corrosion-erosion caused by the action of the concentrated sulfuric acid better than either steel or ductile iron pipe. However, gray cast iron does not have the strength of ductile iron for the same wall thickness. Wall thicknesses, generally used for sulfuric acid piping, range from about ½ inch for 6 inch pipe to approximately 1 inch for 24 inch pipe. This is twice the thickness of nodular iron pipe used for water and wastewater service.

On the other hand, ductile iron pipe has greater strength than gray cast iron pipe. When sulfuric acid moves relatively slowly through the pipe at 3–4 feet per second, ductile iron pipe and gray cast iron pipe have about the same erosion resistance. However, when the sulfuric acid moves at a rate of 10 to 12 feet per second, gray iron pipe outperforms ductile iron pipe and its erosion resistance exceeds that of ductile iron pipe.

While the applicant does not wish to be bound by any scientific explanation of why flake or quasi-flake graphite iron is less erosion resistant than nodular graphite iron, it may be suggested that the graphite in flake or quasi-flake structure will form a mat or interfacing structure which will not be attacked by the hot sulfuric acid. While the metal of the pipe may be corroding, the mat remains to slow down the rate of erosion caused by flow of the sulfuric acid. On the other hand, nodular graphite, while it contributes to the strength of the pipe, does not have the interfacing structure to inhibit erosion caused by the flow of the sulfuric acid.

Although more erosion resistant, flake or quasi-flake graphite fails to provide the strength of spheroidal or ductile graphite because the elongated form of the flake or quasi-flake graphite causes planes of weakness in the iron pipe to degrade its strength.

SUMMARY OF THE INVENTION

The ideal type of pipe would have an outer wall area of nodular graphite iron for strength and an inner wall of flake or quasi-flake graphite inner wall for erosion resistance. The entire pipe would have a pearlite matrix in the entire pipe wall. The ideal pipe would be monolithic pipe with no seams or laminations in its wall. This invention pertains to such a pipe and the method of making it.

OBJECTS OF THE INVENTION

It is the object of the invention to provide a novel monolithic iron pipe which has an outer wall of nodular graphite and an inner wall of flake or quasi-flake graphite.

It is a further object of the present invention to provide a novel monolithic iron pipe having an outer wall of ductile iron and an inner wall of flake or quasi-flake graphite iron without seams or laminations.

It is yet another object of the present invention to provide a novel monolithic iron pipe of the type described which can be made economically and without a great departure from current, well-known foundry practices.

It is yet a further object of the present invention to provide a novel method of making said monolithic iron pipe.

These and other objects of the invention will become apparent to those skilled in the art from a reading of the accompanying description taken together with the drawings which are photomicrographs at 100× as follows.

Figure 1:
FIG. 1 is a photomicrograph illustrating the unetched microstructure of a portion of the outer wall of a heat treated monolithic iron pipe made according to a given chemical formulation.
Figure 2:
FIG. 2 is a photomicrograph illustrating the unetched microstructure of a portion of the mid wall of a heat treated monolithic iron pipe made according to said given chemical formulation.
Figure 3:
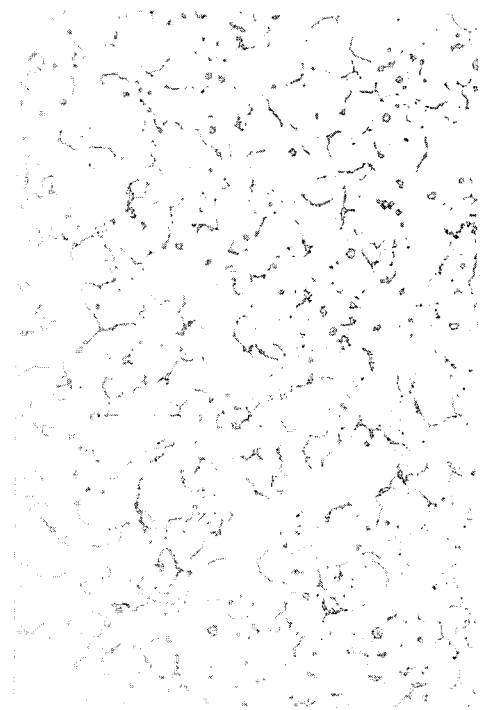
FIG. 3 is a photomicrograph illustrating the unetched microstructure of a portion of the inner wall of a heat treated monolithic iron pipe made according to said given chemical formulation.

As can be seen by a study of FIGS. 1–3, a monolithic iron pipe having a ductile iron outer wall section (FIG. 1), a middle wall which is a mixture of nodular iron and flake or quasi-flake graphite iron (FIG. 2) and an inner wall of flake or quasi-flake graphite iron can be made by using conventional methods of centrifugally casting pipe in cooled metal molds according to the conventional DeLavaud process.

The process of casting the pipes of FIGS. 1–9 is conventional in that molten iron is poured into a rotating metal mold which is cooled on its outer surface by a water spray or a bath of cooling water. The chemical formulation of the molten iron according to the preferred embodiment of the invention may have the following chemical analysis: Carbon 3% by weight, Silicon 1.8% by weight, Sulfur 0.006% by weight, Manganese 0.45% by weight, Phosphorous 0.04% by weight, Copper 1.0% by weight, Tin 0.1% by weight, the remainder being iron. The molten iron is treated with well-known nodularizing agents and also is inoculated with well-known inoculating agents to provide a high concentration of graphitization nuclei in the metal just before and during solidification. The metal must be quickly chilled so that the graphite nodules are formed. This is best accomplished by casting in a water-cooled metal mold using the conventional DeLavaud Process. If the metal is not chilled quickly enough, the proper graphite structure is not formed.

The graphite structure is controlled by the balance between magnesium and sulfur in the molten metal and the freezing rate of the molten metal. Sulfur is present in the molten metal and the amount of sulfur can be reduced by introducing calcium carbide which combines with the sulfur to form calcium sulfide, thus producing a low sulfur iron. The calcium sulfide is a slag which can be removed.

To illustrate the effect of the addition of calcium carbide and magnesium to the molten metal reference may be made to Table I.

TABLE I

| % by Weight | | | % by Weight |
|---|---|---|---|
| A. Addition of Magnesium without Desulfurizing | | | |
| Sulfur content | 0.10 | Sulfur Residual | 0.05 |
| Magnesium addition | 0.50 | Magnesium Residual | 0.15 |
| B. Addition of Magnesium After Desulfurizing With Calcium Carbide | | | |
| Sulfur content | 0.005 | Sulfur Residual | 0.004 |
| Magnesium addition | 0.05 | Magnesium Residual | 0.020 |

From Table I it can be seen that it is advantageous to remove sulfur with the addition of calcium carbide as the amount of magnesium which is a very costly ingredient can be greatly reduced. In Table I, the amount of magnesium to be introduced after the metal has been treated with calcium carbide is 0.05% by weight as compared to 0.50% by weight, if not treated with calcium carbide.

In order to get graphite nodules, it is necessary to retain an excess of magnesium over sulfur in the pipe.

The freezing rate is important in making nodular iron pipe. The faster the freeze rate, the lower the amount of magnesium that must be added. In the DeLavaud process with a centrifugally rotating metal mold and a water spray cooling system, the pipe may freeze in as short a time as 30 seconds. Of course, the thicker the wall of the pipe the greater the freeze time. For a ½ inch thick wall, the freeze time would be about 30 to 45 seconds. For a 1 inch thick wall the freeze time would be about 60 seconds. Usually a 6 inch diameter pipe would be made with a ½ inch thick wall and a 24 inch diameter pipe would be made with a 1 inch thick wall. Heavy wall pipe may be defined which ranges from ½ inch for smaller diameter pipe to 1 inch for larger diameter pipe.

The optimum type of iron pipe for the purposes of the invention is preferably a fully pearlitic structure. In pearlitic iron the carbon combines with the iron and is trapped in the iron. To produce a pearlitic structure, such elements as copper, chromium, and tin may be added to the melt. A pearlitic matrix is more corrosion-erosion resistant than a ferritic matrix.

FIGS. 1–3 illustrate sections of a 16 inch diameter pipe made with 0.019% by weight of magnesium and 0.006% by weight of sulfur.

FIG. 1 shows multiple tiny graphite nodules in almost spherical form. The nodules are uniformly distributed throughout the pearlitic matrix and the result is a strong ductile iron outer wall section of the pipe.

FIG. 2 shows a mixture of graphite nodules and flake and quasi-flake graphite particles. The graphite nodules and the flake and quasi-flake graphite particles are randomly and uniformly interspersed in the middle section of the pipe.

FIG. 3 shows a mixture of flake and quasi-flake graphite particles with a minimum of graphite nodules. The flakes intertwine to form a mat which holds together to reduce the erosion caused by sulfuric acid when the pipe is used in that environment.

The amount of magnesium may range from about 0.01% by weight to 0.03% by weight.

The preferred excess of magnesium over sulfur is about 0.015 but can range from 0.005% to 0.025 depending on the freezing rate.

Because the metal mold is cooled by a water spray, the outer wall of the pipe chills faster than the inner wall causing uniform graphite nodules to form in the outer section of the pipe and flake and quasi-flake graphite to form in the inner wall section.

If only a pipe with a given wall thickness and given diameter were to be made, then the proper amount of the excess of magnesium would be determined and the process would uniformly produce pipes with the proper structure. However, in general commercial practice, it is common to make pipes with different wall thicknesses and diameters in a line of centrifugal metal molds using the same melt. If this is done, the pipes will not necessarily be of uniform structure with the proper nodular graphite in the outer wall and the proper flake and quasi-flake graphite in the inner wall.

To overcome this problem, it has been found that if titanium was added, the titanium acted as a stabilizer and the range of excess of magnesium becomes less critical. FIGS. 4–9 will illustrate this point.

Figure 4:
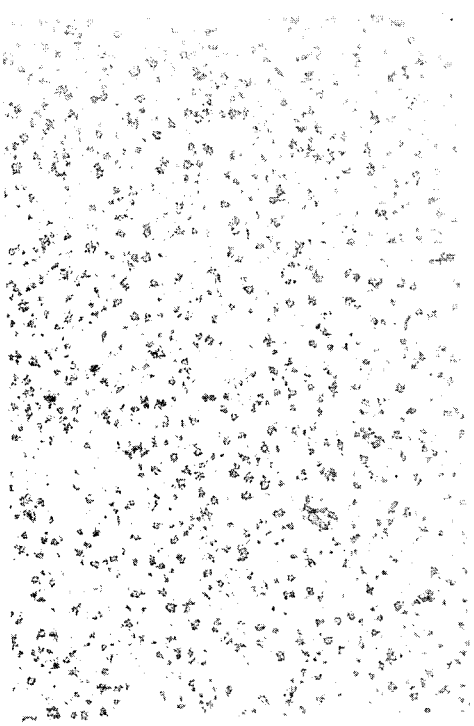
FIG. 4 is a photomicrograph illustrating the unetched microstructure of a portion of the outer wall of a heat treated monolithic iron pipe made according to an alternative chemical formulation.
Figure 5:
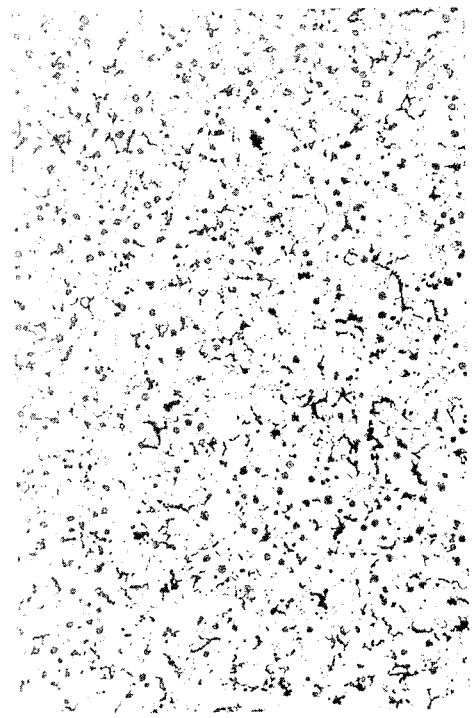
FIG. 5 is a photomicrograph illustrating the unetched microstructure of a portion of the mid wall of a heat treated monolithic iron pipe made according to said alternative chemical formulation.
Figure 6:
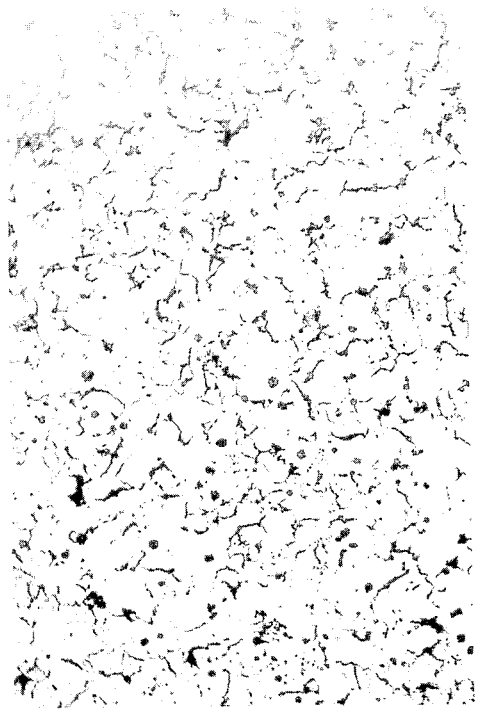
FIG. 6 is a photomicrograph illustrating the unetched microstructure of a portion of the inner wall of a heat treated monolithic iron pipe made according to said alternative chemical formulation.

FIGS. 4–6 show three sections of an 18 inch diameter pipe with a 1 inch thick wall. FIG. 4 shows the outer wall section of the pipe. The pipe was made with 0.026% by weight of magnesium, 0.004% by weight of sulfur and 0.21% by weight of titanium.

The graphite nodules shown in FIG. 4 are less definite and coarser in shape than those shown in FIG. 1. However, these graphite nodules are adequate to form a pipe with a strong outer wall. FIG. 5 shows the midwall section with a combination of nodular graphite and flake and quasi-flake graphite. FIG. 6 shows more flake graphite than does FIG. 3 and one would expect this pipe to be better in erosion resistance than that of FIG. 3.

Figure 7:
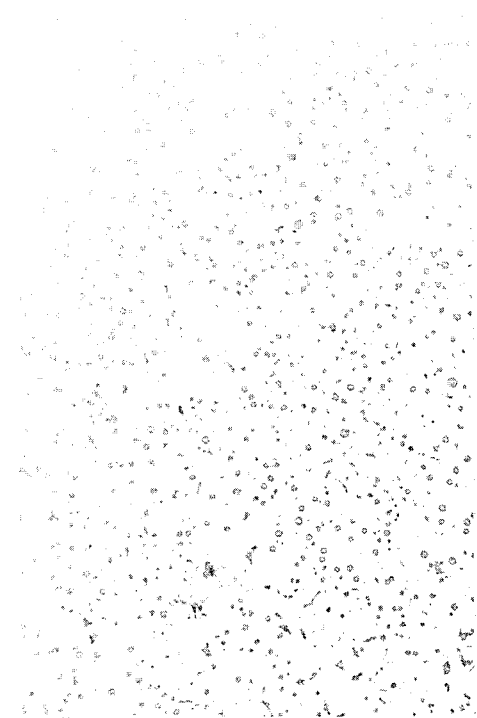
FIG. 7 is a photomicrograph illustrating the unetched microstructure of a portion of the outer wall of a heat treated monolithic iron pipe made according to a still further alternative chemical formulation.
Figure 8:
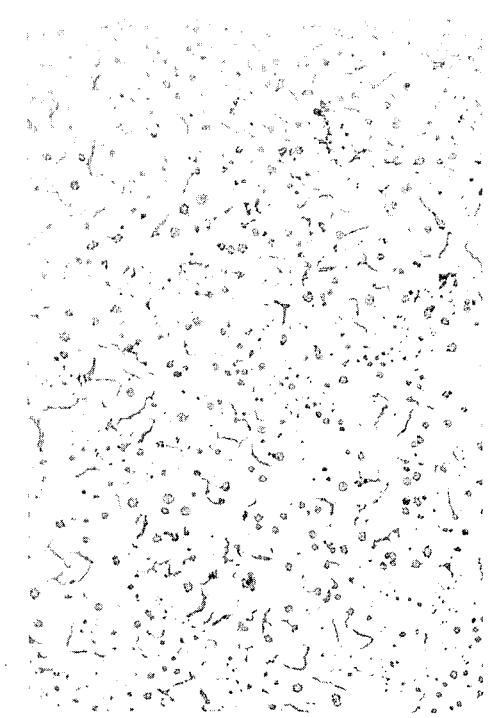
FIG. 8 is a photomicrograph illustrating the unetched microstructure of a portion of the outer wall of a heat treated monolithic iron pipe made according to said still further alternative chemical formulation.
Figure 9:
FIG. 9 is a photomicrograph illustrating the unetched microstructure of a portion of the inner wall of a heat treated monolithic iron pipe made according to said still further alternative chemical formulation.

The pipe of FIGS. 7-9 is made with 0.020% by weight of magnesium, 0.005% by weight of sulfur and 0.08% by weight of titanium. The pipe of FIG. 7 has better defined graphite nodules than that of FIG. 4 and the pipe of FIG. 9 has less flake and quasi-flake graphite than the pipe shown in FIG. 6. The lower amount of titanium in the pipe of FIGS. 7-9 seems to make that pipe closer in structure to that of the pipe of FIGS. 1-3 than to the structure of the pipe of FIGS. 4-6. There would, therefore, seem to be a limit to the amount of titanium to be added for proper formation of the structure of the pipe.

FIG. 8 shows the midwall section with a combination of nodular graphite and flake and quasi-flake graphite.

Titanium in an amount of between 0.1% and 0.3% by weight will produce a pipe with a nodular graphite outer section and flake or quasi-flake graphite in its inner section. The amount of titanium should be about 0.15% by weight for 0.005% by weight sulfur and between 0.020% and 0.026% by weight of magnesium for an 18 inch diameter pipe having a wall thickness of 0.9 inch.

If the amount of sulfur changes, then the amount of magnesium should be changed to provide the desired excess of magnesium over sulfur.

The present invention provides a process for making a dual structured pipe in which the outer section is nodular graphite and the inner section is flake or quasi-flake graphite. The process involves the addition of magnesium to the conventional iron melt. A further refinement is the addition of a small amount of titanium for stability and repeatability regardless of wall thickness. Other elements which can be used with or as a replacement for titanium, the preferred element, are lead and antimony.

While what has been described is a novel dual structured iron pipe and the method of making said pipe, it should be understood that the invention is not to be limited to the specific embodiments described, as many variations may be made. It is, therefore, contemplated that any and all such modifications be covered by the appended claims.

We claim:

1. A centrifugally cast heavy wall iron pipe having a monolithic wall, said monolithic wall comprising an outer portion containing nodular graphite and an inner portion containing flake and quasi-flake graphite, said cast iron pipe further containing between about 0.01% by weight and 0.03% by weight of magnesium, and between about 0.004% by weight and 0.006% by weight of sulfur.

2. A centrifugally cast heavy wall iron pipe as recited in claim 1, in which said cast iron pipe contains between 0.1% by weight and 0.3% by weight of titanium.

3. A centrifugally cast heavy wall iron pipe as recited in claim 2 in which said cast iron pipe contains 0.023% by weight of magnesium, 0.005% by weight of sulfur and 0.15% by weight of titanium.

* * * * *